April 7, 1942.         J. HINNÜBER ET AL         2,279,045
              METAL BONDED ABRASIVE BODY
                  Filed June 8, 1940
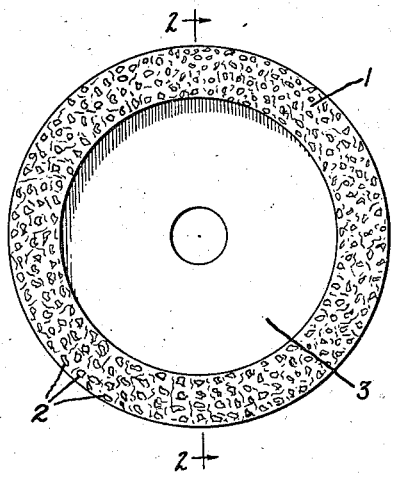
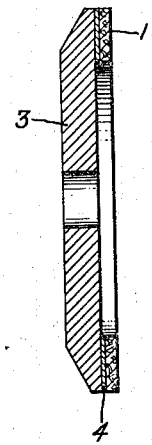
Inventors:
Josef Hinnüber,
Ernst Ammann,
by Harry E. Dunham
His Attorney.

Patented Apr. 7, 1942

2,279,045

UNITED STATES PATENT OFFICE 2,279,045

METAL BONDED ABRASIVE BODY

Josef Hinnüber and Ernst Ammann, Essen, Germany, assignors to General Electric Company, a corporation of New York Application June 8, 1940, Serial No. 339,592
In Germany June 15, 1939

4 Claims. (Cl. 51—209)

When brazing hard metal alloy tips to steel supports, for instance cutting tips to the supporting shank of cutting tools, severe stresses are known to be set up on cooling owing to the different coefficients of expansion of the materials used, such stresses being liable, in certain circumstances, to lead to cracking of the hard metal alloy tips. It has previously been proposed to render these stresses largely ineffective by so placing thin foils of soft metal or a fine-meshed wire cloth into the brazing joint that an elastic cushion is formed, so to speak, between the hard metal alloy tip and its support.

This procedure, however, does not give the desired result when it is intended to braze hard metal alloy rings and similar shapes to their supports, as in such cases, owing to the cross-sectional area of the seating being small compared to the outer dimensions of the rings, small forces may cause bursting of the rings. The danger of fracturing of the rings naturally increases as the diameter of the rings grows larger and the cross-sectional area of the ring seating becomes smaller.

According to the invention, the afore-mentioned difficulties are eliminated by using a support made from an alloy the expansion rate of which is approximately equal to that of the hard metal alloy ring. When using such alloys, for instance steel alloys, it is also advisable to choose a solder which will bind at a relatively low temperature. This tends to prevent the support when excessively heated from expanding too much compared with the hard metal alloy ring because every steel alloy, which at low temperatures possesses a low coefficient of expansion—for instance $5 \times 10^{-6}$—which is almost equal to that of the hard metal alloy, expands in a greater measure at high temperatures than hard metal alloy.

The novel features which are characteristic of our invention are set forth with particularity in the appended claims. Our invention, however, will best be understood from reference to the following specification when considered in connection with the accompanying drawing in which Fig. 1 is a plan view of a grinding ring secured to a supporting base member and Fig. 2 is a cross sectional view on line 2—2 of Fig. 1.

In carrying out our invention an annular grinding body 1 is employed which consists of a sintered hard metal alloy impregnated with diamond particles 2 and secured to a base 3 by means of a layer of solder 4. The base 3 consists of an iron-nickel alloy containing about 38 to 45% nickel with the remainder iron, while the solder employed has a melting point below 700° C.

A support made of an iron nickel alloy with about 38 to 45% of nickel has been found to present particular advantages. The expansion curve of this alloy practically runs parallel to that of hard metal alloy from room temperature onward to about 400° C. but as the temperature increases, this curve deviates more and more from the expansion curve of hard metal alloy. It is therefore convenient to use a solder with a melting point below 700° C. A suitable silver solder, which permits of obtaining a good bond at only about 650° C. would, for instance, have the following composition:

| | Per cent |
|---|---|
| Copper | 15.5 |
| Zinc | 15.5 |
| Nickel | 3 |
| Cadmium | 16 |
| Silver | 50 |

The present invention is particularly valuable for securing grinding rings charged with diamond particles and which, owing to these diamonds acting as foreign matter, are inferior in strength to the normal type of hard metal alloy. Such grinding rings represent a high value and for this reason also they must be brazed to their support in a crack-proof manner so that, with the high peripheral speeds used, no chipping may result.

What we claim and desire to secure by Letters Patent is:

1. A tool consisting of a ring-shaped hard metal alloy, a support therefor and an intermediate layer of solder between said alloy and support, said hard alloy and support having substantially equal coefficients of expansion, said support consisting of an iron-nickel alloy containing about 38 to 45% nickel, and said solder having a melting point below 700° C.

2. A tool consisting of a ring-shaped hard metal alloy, a support therefor and an intermediate layer of solder between said alloy and support, said hard alloy and support having substantially equal coefficients of expansion, said support consisting of an iron-nickel alloy containing about 38 to 45% nickel, and said solder consisting of about 50% silver, 16% cadmium, 3% nickel, 15½% zinc and 15½% copper.

3. A tool structure consisting of a ring-shaped hard metal body charged with diamonds, a support therefor and an intermediate layer of silver solder, said metal body and support having substantially equal coefficients of expansion, said structure being characterized by the fact that said support consists of a nickel-iron alloy containing about 38 to 45% nickel and said solder has a melting point below 700° C.

4. A tool consisting of a flat ring having inner and outer surfaces in substantially parallel planes, said ring consisting of a hard metal body impregnated with diamonds, the inner surface of said ring being secured by means of a layer of solder having a melting point below 700° C. to a flat supporting member having substantially the same coefficient of expansion as said ring.

JOSEF HINNÜBER.
ERNST AMMANN.